(12) United States Patent
Janatka et al.

(10) Patent No.: US 6,450,313 B1
(45) Date of Patent: Sep. 17, 2002

(54) LOCKING MEANS FOR COMPONENTS MOUNTED ON SUPPORT SHAFTS

(75) Inventors: Karel J. Janatka, Southbury, CT (US); Edward M. Ifkovits, New Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 25 days.

(21) Appl. No.: 09/752,173

(22) Filed: Dec. 29, 2000

(51) Int. Cl.⁷ .............................................. F16D 41/04
(52) U.S. Cl. ............................. 192/48.92; 188/82.84
(58) Field of Search .............................. 192/48.92, 44; 193/37; 198/824; 188/82.84

(56) References Cited

U.S. PATENT DOCUMENTS

| | | | |
|---|---|---|---|
| 2,970,489 A | * | 2/1961 | Eason ........................ 192/44 |
| 3,539,042 A | * | 11/1970 | Sacchini ................. 192/48.92 |
| 3,994,377 A | | 11/1976 | Elmore ........................ 192/45 |
| 5,228,787 A | | 7/1993 | Lawson ...................... 384/535 |
| 6,074,304 A | * | 6/2000 | Olbrich et al. ........... 192/48.92 |
| 6,336,542 B1 | * | 1/2002 | Mintonye, II ................ 193/37 |

* cited by examiner

*Primary Examiner*—Rodney H. Bonck
(74) *Attorney, Agent, or Firm*—Michael J. Cummings; Angelo N. Chaclas

(57) ABSTRACT

The present invention relates to locking and locating cylindrical components or roller sleeve assemblies on a support shaft. The locking feature is an anti-rotation device that prevents rotation of the roller assembly or sleeve assembly on the support shaft. The locking feature permits axial location of the component or sleeve to a pre-determined position as desired. A pair of over-running clutches or one-way clutches is used to facilitate the feature. The clutches are assembled to a receiving bore in the component or sleeve so that they are able to lock on the support shaft in reverse directions, thereby preventing rotation of those parts on the support shaft.

3 Claims, 4 Drawing Sheets

LOCKING MEANS FOR COMPONENTS MOUNTED ON SUPPORT SHAFTS

BACKGROUND

The present invention relates to the assembly of rotatable shafts and the components that are mounted upon them. The support shafts that hold cylindrical components used for conveying articles have to be located in an axial relationship to the support frames or members that hold them. Typically, the axial relationship of such cylindrical components or assemblies that are used for conveying objects are aligned with other similar components in machinery. The tolerance buildup of the components from one assembly to another may mean that the alignment is actually mis-aligned, thereby causing problems in the conveying or transport of the articles that are moving on them. In the past, there have been numerous ways to overcome this problem, such as machining a flat upon the shaft, and then machining the mounted cylindrical hardware to fit a setscrew or other locking member to attach to the flatted shaft. The machining of the shaft is expensive and labor intensive, as is applying the setscrew or other locking device. In addition, a setscrew design tends to pull the inner portion of the part being added to the support shaft to one side, thereby creating an out of round assembly. Also, burrs on the shaft may present further problems in disassembling or reassembling the shaft components.

Another way of locating such assemblies or cylindrical components is with the use of e-clips, or e-rings. The use of a tri-lobe or d-shaped shaft will fit the components being added with a similar designed aperture; however, there will be an undesired amount of free play between the shaft and the added components. This is not tolerable in critical transport or conveying situations where articles are expected to arrive at scheduled locations at particular times and increments of time. So, this prior art design is labor-intensive, requiring lathe set-up to machine grooves in the support shafts, and at assembly, installing the e-clips upon the shaft. In addition, there may be reliability problems associated with the concentricity, and expected transport results from this type of assembly. There may be a further complication unless due care is taken in the design of the support shaft since cutting grooves into the shaft may affect a stress condition, and an unpredictable failure, especially with the application of heavy loading upon the cylindrical member and its support shaft.

For these reasons, the present invention has evolved, and will eliminate assembly and tolerance problems related to concentricity, axial positioning of the added shaft components, and stress related failures. There are no grooves required in the support shafts with the use of the principles of the present invention, and the assembly of the cylindrical components on a support shaft is simplified and reliable. In addition, there are no setscrews, or machining of the support shaft, other than those required for automatic lathe processing.

FIELD OF THE INVENTION

The present invention may be utilized in all sorts of conveying machinery where there are roller assemblies mounted on support shafts, that are in turn supported in frames or support structure of the machinery. The present invention is designed to provide a highly accurate concentric assembly of components added to transport or conveying shafting where the support shaft rotates with the assembly attached. The present invention eliminates the need for cutting grooves in the support shafts or machining flats or other locating areas on the mounting or support shafts. The present invention also eliminates the need to apply devices such as e-rings or e-clips to then locate the assembly along a specific axial position on the shaft. This is particularly useful in high-speed paper conveying machinery, or other equipment that requires highly accurate timing and location of the transport devices to insure reliability.

SUMMARY OF THE INVENTION

The present invention concerns locking and locating cylindrical components or roller sleeves on a support shaft to facilitate anti-rotation of the components or sleeves on the shaft. The cylindrical components are typical such as conveying rollers or transport rollers that are manufactured as sleeve assemblies utilized to move and convey articles along a transport path. The locking and locating feature is an anti-rotation device that is accomplished through the use of at least one pair of over-running clutches or one-way clutches that are assembled into a prepared cavity located along the axis of the cylindrical component. The axial cavity may be a bore, or concentric bores located at both axial ends of the cylindrical component. Each over running clutch or one-way device is pressed into the cavity at either end of the cylindrical component so that each clutch faces an opposite direction. When the cylindrical component or roller sleeve is installed on the support shaft, the components of the over running clutches or one-way devices lock against the support shaft and each other, thereby providing an assembly that is rotatable as one unit; the cylindrical component further being axially positionable to a predetermined location on the support shaft.

The above background and brief description of the advantages of the present invention will be apparent upon consideration of the following detailed description when taken in conjunction with accompanying drawings. In the accompanying drawings, like reference characters refer to like parts throughout, and in which:

DESCRIPTION OF THE INVENTION

Figure 1:
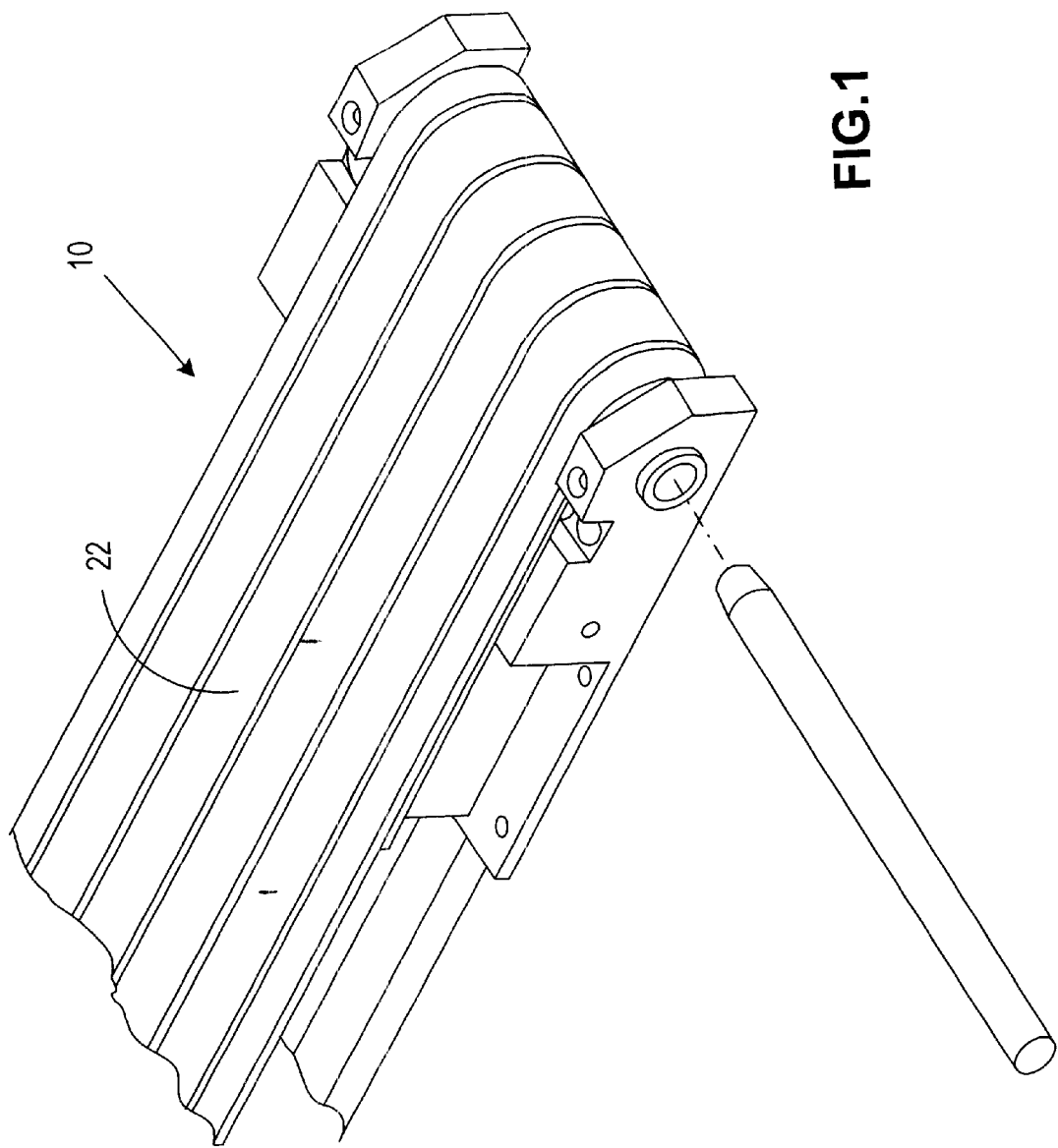
FIG. 1 is an isometric view of a document transport assembly where the present invention is utilized.

Referring to FIG. 1, there is shown an isometric view of a document transport assembly 10. This is a typical transport assembly used as an example as it may be utilized in Pitney Bowes Inserting Products that have vacuum assisted transport systems. The document transport system 10 illustrated is used to transport envelopes, and in other portions of Pitney Bowes inserting products to move sheets of paper of all sizes and types. The transport system 10 is designed to be positioned in a (not shown) main machine structure that can accommodate many similar such transport units. The present invention relates to how the supporting transport rollers are mounted for rotation as a unit, and axially positioned for supporting for example, sets of belts or other conveying instruments. The present drawings and illustrations are one example of how the present invention may be applied to conveying equipment. Such equipment may consist of rollers supporting belts as shown, or may consist of transport rollers alone. In either case, the present invention has utility to solve the problems described in the background of this patent application.

Figure 2:
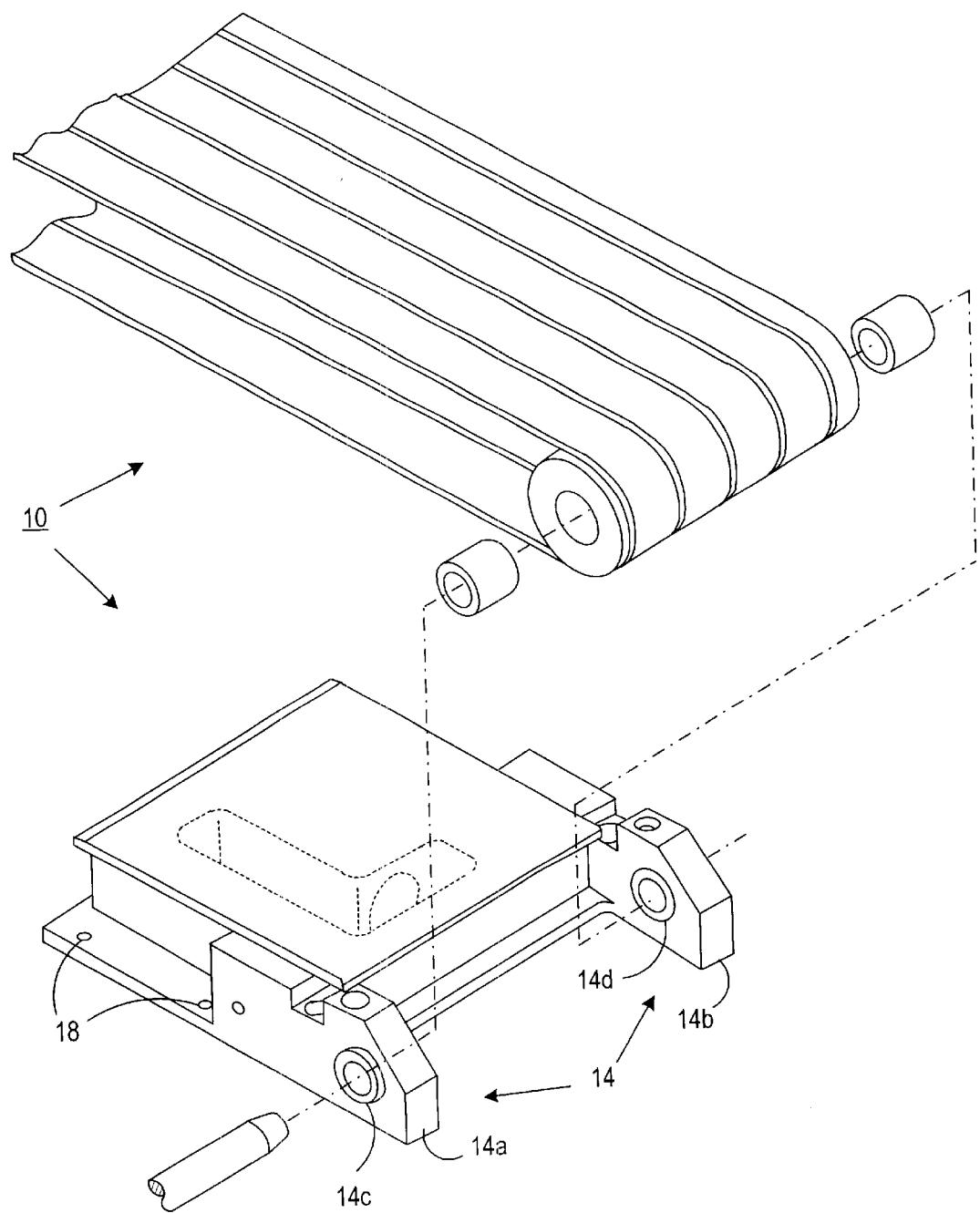
FIG. 2 is an exploded isometric view of the components utilized in the assembly of FIG. 1.

Referring to FIG. 2, there is shown a machined support frame 14. The support frame 14 is designed to be mounted on the main machine structure referred to earlier, and a series of mounting apertures 18 will accommodate the necessary mounting hardware to do so. The support frame 14 has a bearing support ear 14a and 14b, each having a suitable ball bearing 14c and 14d (or ball bearing equivalent) pressed into the support ear 14a and 14b respectively.

Figure 3:
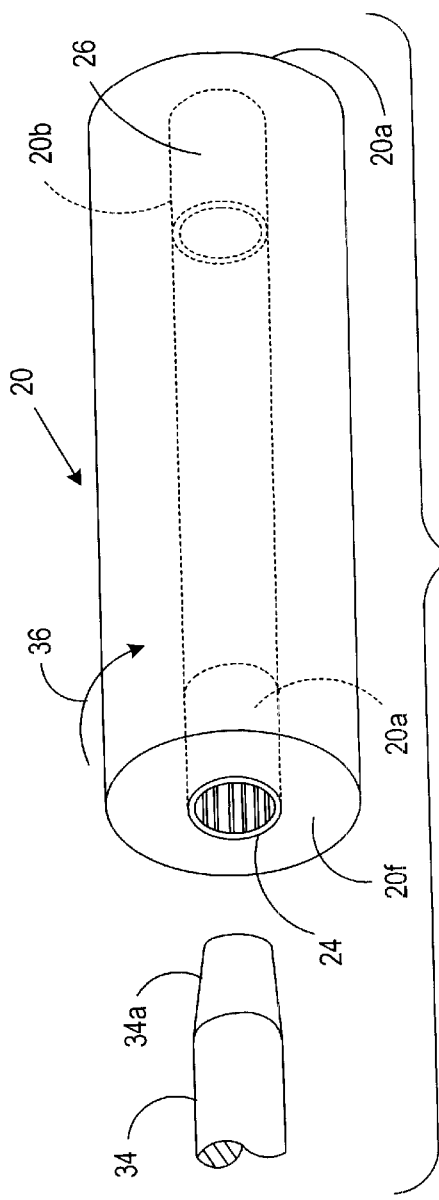
FIG. 3 is an isometric view of the roller assembly utilized in the transport assembly of FIG. 1.

Referring now to FIG. 3, there is shown an isometric view of a roller sleeve 20 as removed from the transport assembly 10. The roller sleeve 20 is typical of such roller sleeves that are used in conveyor equipment, and in the present case is used to support a plurality of conveyor belts 22 (FIG. 1). (Some roller assemblies or roller sleeves have built in crowns that track the conveying belts in a desired lateral position).

The Anti-Rotation Feature

There is a first support element 24 (over running clutch) pressed into an end cavity (bore) 20a of the roller sleeve 20. There is a second support element 26 (over running clutch) pressed into an opposing end cavity 20b of the roller sleeve 20. It will be noted that the cavity 20a and 20b are one and the same of an axial bore of the roller sleeve 20. Alternatively this design may be such that the end cavity 20a and 20b are of larger diameter, smaller diameter or the same as shown with regard to the axis of the roller sleeve 20. (This will depend upon the size of the over running clutch selected, as well as the physical design of the roller sleeve). The concentricity of the diameters of the cavity 20a and 20b are very close in tolerance limits (if they are diameters different than that illustrated as a bore) which affords the greater benefit of accuracy in rotation of the roller sleeve 20. The first and second support elements 24 and 26 (over running clutches) referred to are typical of those manufactured by the Torrington Manufacturing Company. An example of an over running clutch is shown in U.S. Pat. No. 3,994,377 to Elmore for OVERRUNNING CLUTCH RETAINER AND ROLLER ASSEMBLY.

Referring once again to FIG. 3, the roller sleeve 20 is shown with the first and second support elements 24 and 26 installed or pressed into the end of the principal roller section. The support elements 24 and 26 are flush with an end 20f, and 20g respectively of the roller sleeve 20 to afford the greatest possible length of fit with respect to the end cavity 20a, and opposing end cavity 20b respectively. The first support element 24 is installed so that the locking rollers internal to the Torrington over running clutch will lock on a shaft 34 once the shaft 34 is inserted into the support element 24. This means that if only the first support element 24 were installed by itself into the roller sleeve 20, the roller sleeve 20 could rotate in a CW direction 36 as indicated by the (Clockwise) arrow. (This may depend upon the assembly instructions of the over running clutch supplier). The second support element 26 is inserted into the opposing end cavity such that it is 180 degrees reversed from the first support element 24. Once again, if only the second support element (over running clutch) were inserted into the opposing end cavity 20b, the roller sleeve 20 would be able to rotate in the direction 36. However, once both the first support element 24 and the second support element 26 are both inserted into their respective end cavities 20a, and 20b, the roller cage inside of the over running clutch in each case is reversed, and with the insertion of the shaft 34 will lock against any rotation attempted upon the roller sleeve 20.

It is possible to slide the shaft 34 along the length of the roller sleeve to a pre-determined axial position. The shaft 34 should be aligned with the first and second support elements 24 and 26 so that the major outside diameter of the shaft 34 is supported by the aforementioned support elements. The shaft 34 is formed with a taper 34a, which is used to assist in the insertion process. The taper may be a radius, or other shallow form that will assist the assembly process, either of which or some variation in between will allow the shaft 34 to be inserted through both of the aforementioned support elements 24 and 26. A taper of approximately 2 to 5 degrees is sufficient to permit assembly of the shaft 34 into the new bore of the roller 20 as established by the first and second support elements 24 and 26. The shaft 34 is formed of suitable case hardenable steel. Following guidelines of assembly of the over running clutch designs, a Rc hardness of between 55–60 is suitable to insure that the roller elements of the over running clutch work properly in locking with the shaft.

Referring back to FIG. 1, it will now be recognized that insertion of the shaft 34 through the Machine support frame 14 in the bearing support ear 14a and 14b bearings as described will provide a complete assembly in the area of the document transfer assembly as described. Typically, in most transport assemblies or conveyor assemblies there has to be a second support roller or shaft. In the present case there is an end structure, that is a second shaft support structure (not shown), having the same assembly technique for locating and supporting a second roller sleeve and the opposite ends of the conveying belts 22. The benefit of this technique becomes apparent when the shaft 34 is inserted and the roller sleeve 20 is now trapped and located between the bearing support ears 14a and 14b respectively. Not shown, there could be suitable washers or spacers inserted between the inside portions of the ears 14a and 14b to help position the roller laterally (axially) to a pre-determined point. Other benefits include the elimination of installing retaining rings, e-clips or other hardware that require machining of the support shaft, and possible installation of set-screws. Set-screws are notorious for backing off due to vibration and rapid start/stops of conveying assemblies.

Figure 4:
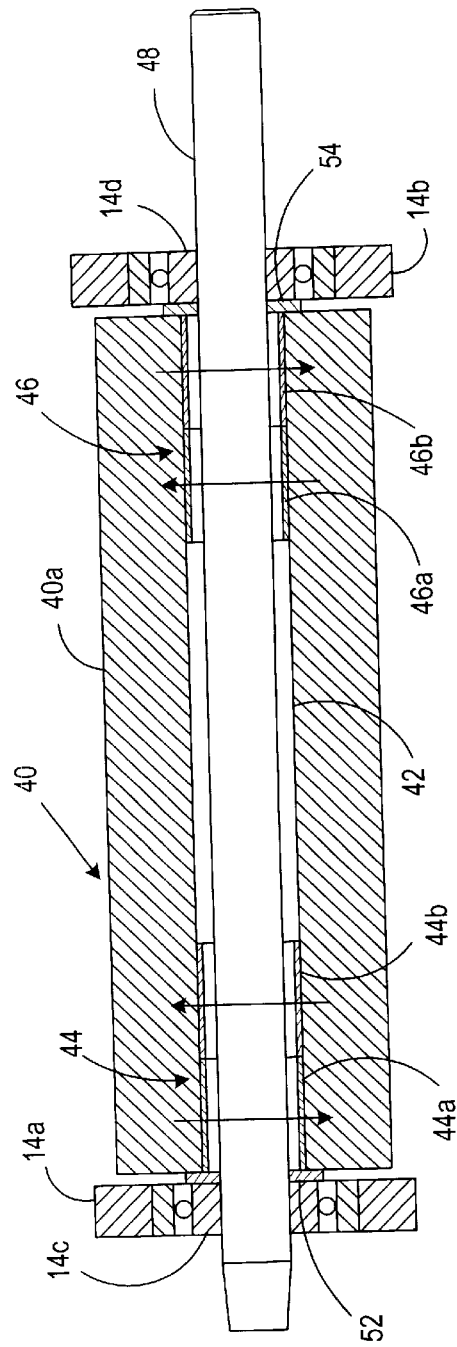
FIG. 4 is a section view of an alternative roller assembly used in the transport assembly of FIG. 1.
Figure 5:
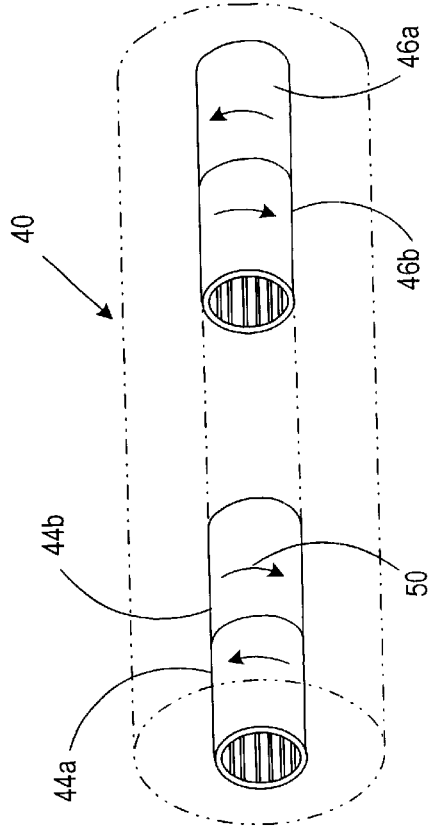
FIG. 5 is an isometric view of the roller assembly of FIG. 4 without the support shaft.

Description of an alternative embodiment of the present invention as a anti-rotation device:

Referring to FIG. 4, a cross sectional view of another roller assembly 40 is shown. The roller assembly has a bore 42 that is concentric to an outside diameter 40a of the roller assembly 40. There is a pair of support elements 44 and an opposing pair of support elements 46 each consisting of a first support element 44a, a second support element 44b, a first support element 46a, and a second support element 46b. The support elements 44a, 44b, 46a, and 46b are assembled into the bore 42 of the roller assembly 40 in the following way. Second support element 44b such that if assembled alone would permit rotation of the roller assembly on a support shaft 48 in a direction 50 (FIG. 5), providing no other support elements are also inserted into the bore 42. When the first support element 44a is inserted into the bore 42, the pair of support elements 44 will prevent rotation of the roller assembly 40 on the support shaft 48. This is the same for the pair of opposing support elements 46, when the first support element 46a, and the second support element 46b are inserted into the bore 42. The roller assembly 40 is shown as it would be located between the bearing support ear 14a and 14b in the prior embodiment. The assembly of additional support elements will insure that the roller assembly is locked on the shaft 50 for example where there is rapid, high energy start/stop conditions in the transport that would ordinarily shake a setscrew or other fastening member loose from the support shaft.

Figure 6:
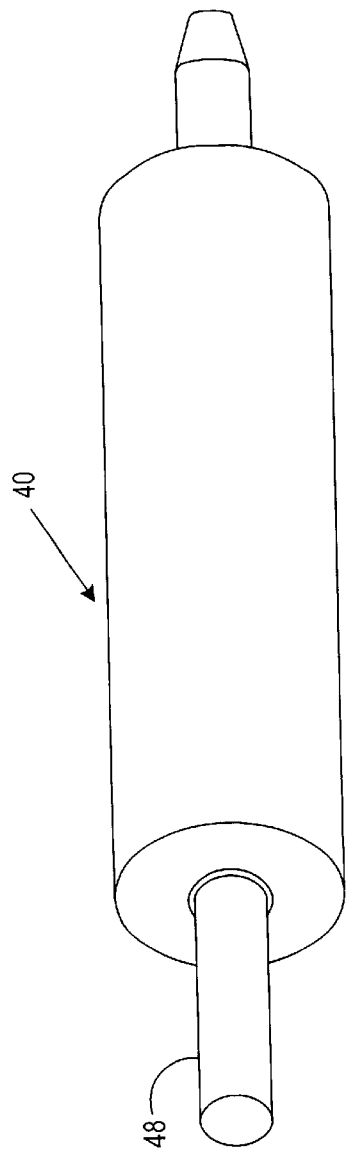
FIG. 6 is an isometric view of the roller assembly of FIG. 4 with the support shaft.

In FIG. 4, there is shown a thrust washer 52 and 54, used to help axially locate the roller assembly 40 between the support ear 14a and 14b. Other suitable washers, rings, helical springs or conical springs may be used to help justify the roller assembly 40 to one side or the other of the support frame 14 as may be desired. FIG. 6 is a representative assembly of the roller assembly 40 and the support shaft 48. It will be noted that the shaft 50 has a similar tapered end to that described in the previous embodiment and the shaft 34.

There may be other combinations considered that combine roller assemblies, support shafts and support elements utilizing one way clutches or over running clutches in the manner described in the present specification. These alternate combinations will be known by those skilled in the art as can be applied to the system as described in the embodiments described in this specification, and it would be space consuming in the present specification to provide such other combinations that will be known and used by those skilled in the art. Therefore, the preceding detailed specification, drawings, and description of same sets forth examples of how the combination of reverse acting devices such as over running clutches or one way clutches may be applied to conveying rollers or their substitutes.

Further advantages and modifications will readily occur to those skilled in the art. Therefore, in its broader aspects, the invention is not limited to the specific details, and representative devices shown and described herein. Accordingly, various modifications may be made without departing from the spirit or scope of the general inventive concept as defined by the appended claims.

What is claimed is:

1. An anti-rotation apparatus for components mounted on a shaft, comprising;

(a) a support shaft;

(b) a roller sleeve carried upon the support shaft, the roller sleeve having a cavity at each end wherein each cavity is capable receiving at least one support element, and;

(c) a plurality of support elements, each having rotatable locking characteristics when engaged with the support shaft such that a first support element and a second support element are permanently inserted into the cavity at a first end of the roller sleeve so that the first support element locks on the support shaft in a first direction, and the second support element is permanently inserted into a first end of the roller sleeve so that the second support element locks on the support shaft in a second direction, and a third support element and a fourth support element are permanently inserted into the cavity at a second end of the roller sleeve so that the third support element locks with the support shaft in the first direction on the support shaft, and the fourth support element locks on the support shaft in the second direction.

2. An anti-rotation apparatus for components mounted on a shaft as recited in claim 1 wherein the first, second, third and fourth support elements are over-running clutches.

3. An anti-rotation apparatus for components mounted on a shaft as recited in claim 1 wherein the first, second, third and fourth support elements are one-way clutches.

* * * * *